US011892757B2

(12) United States Patent
Scheich

(10) Patent No.: US 11,892,757 B2
(45) Date of Patent: Feb. 6, 2024

(54) VEHICLE PHOTOGRAPHIC AND INSPECTION BOOTH

(71) Applicant: Carvana, LLC, Tempe, AZ (US)

(72) Inventor: Davo Scheich, Troy, MI (US)

(73) Assignee: Carvana, LLC, Tempe, AZ (US)

(*) Notice: Subject to any disclaimer, the term of this patent is extended or adjusted under 35 U.S.C. 154(b) by 0 days.

(21) Appl. No.: 17/604,038

(22) PCT Filed: Apr. 29, 2020

(86) PCT No.: PCT/US2020/030399
§ 371 (c)(1),
(2) Date: Oct. 15, 2021

(87) PCT Pub. No.: WO2020/223301
PCT Pub. Date: Nov. 5, 2020

(65) Prior Publication Data
US 2022/0146915 A1    May 12, 2022

Related U.S. Application Data

(60) Provisional application No. 62/839,818, filed on Apr. 29, 2019.

(51) Int. Cl.
G03B 17/56   (2021.01)
G03B 15/07   (2021.01)
B66F 7/00    (2006.01)

(52) U.S. Cl.
CPC ........... G03B 17/561 (2013.01); B66F 7/00 (2013.01); G03B 15/07 (2013.01)

(58) Field of Classification Search
CPC ........ G03B 17/561; G03B 15/07; B66F 7/00; G01N 21/8806
See application file for complete search history.

(56) References Cited

U.S. PATENT DOCUMENTS 5,436,726 A * 7/1995 Ventura .............. G01N 21/8806
                                                356/613
5,636,024 A   6/1997 Crookham et al.
6,012,825 A * 1/2000 Horner ..................... F21V 7/005
                                                362/297

(Continued)

FOREIGN PATENT DOCUMENTS

JP    S56132509 A    10/1981

OTHER PUBLICATIONS

Int'l Search Report for PCT/US2020/030399, dated Aug. 7, 2020.

Primary Examiner — Christopher E Mahoney
(74) Attorney, Agent, or Firm — SNELL & WILMER L.L.P.

(57) ABSTRACT

A booth for photographing or inspecting a vehicle includes walls that bounding a planar stage, each of the walls has a first portion and a second portion, the first portion has a first length and extending up from the planar stage. A first end of the first portion forms a first obtuse angle with the planar stage inside the booth, the second portion has a second length and extending up from a second end of the first portion. A first end of the second portion forms a second obtuse angle with the second end of the first portion inside the booth. A platform is also suspended above the stage. A lighting source is positioned on the platform. The lighting source is configured to direct light toward the second portion of each of the walls.

20 Claims, 11 Drawing Sheets

(56) References Cited

U.S. PATENT DOCUMENTS

| | | |
|---|---|---|
| 6,147,752 A | 11/2000 | Hewitt et al. |
| 2013/0057678 A1 | 3/2013 | Prior Carrillo et al. |
| 2016/0100087 A1 | 4/2016 | Scheich |
| 2017/0180696 A1* | 6/2017 | Broughton ............... H04N 7/18 |

* cited by examiner

VEHICLE PHOTOGRAPHIC AND INSPECTION BOOTH

RELATED APPLICATIONS

This application is a U.S. national stage entry under 35 U.S.C. § 371 of International Application No. PCT/US2020/030399 filed Apr. 29, 2020 entitled "VEHICLE PHOTOGRAPHIC AND INSPECTION BOOTH." The '399 PCT claims priority to, and the benefit of, U.S. Provisional Application Ser. No. 62/839,818 filed on Apr. 29, 2019, entitled "VEHICLE PHOTOGRAPHIC AND INSPECTION BOOTH." Each of the foregoing applications are hereby incorporated by reference in their entirety for all purposes.

FIELD OF THE INVENTION

The present invention in general relates to a system for photographing and inspecting vehicles; and in particular, to an enclosable booth structure configured to cast indirect light upon a vehicle for high quality inspection and capturing of high-quality photographs of the vehicle without unwanted glare and light reflections appearing on the vehicle body

BACKGROUND OF THE INVENTION

Auto auctions play a major role as a wholesale market for second-hand vehicles. Most auto auctions are closed auctions, meaning only dealers can use them. There are also auctions that are open to the public. These auctions are a primary outlet for financial services firms to dispose of their large volume of off-lease returns, for rental and other companies to sell off their aging fleets, and for car dealerships to dump trade-ins or other unwanted inventory. Some auctions are used by banks, the Internal Revenue Service, and other government agencies to sell vehicles that were repossessed for failure to make monthly payments or pay taxes, or were seized by the government agencies, or the police.

Some used vehicles include a warranty for repairs, supplied by the seller of the vehicle. Such warranties are typically based on a detailed inspection of each vehicle. For example, if an inspector misses that a vehicle is leaking oil, the seller may later have to pay for the repair of fixing the oil leak under the warranty. Therefore, the inspectors must be able to adequately see all areas and features of a vehicle they are inspecting, which includes adequate lighting of the vehicle and the ability to see all areas of the vehicle, including the underbody. Currently, inspectors are typically required to get on their hands and knees with a flashlight in order to inspect the underside of a vehicle, which can be difficult for the inspector, lead to errors in the inspection, or injuries for the inspector.

Online auto auctions have also been growing in popularity. One of the most popular online auctions to buy vehicles from is eBay™. On eBay Motors™, a user can create an account and put their vehicles up for auction. Other popular websites include Cars.com™. Typically, online vehicle sales are based solely on images of the vehicle, since the buyer is in a remote location and is unable to view the vehicle in question in person. Thus, many high-quality images are required of the vehicle from many perspectives to allow a buyer to gain an understanding of a subject vehicle's condition and appearance. FIGS. 1A and 1B are typical non-studio quality vehicle photographs that are used to list vehicles for sale. The images shown in FIGS. 1A and 1B are of low quality and fail to adequately show all of the features of the vehicle that a perspective purchaser may be interested in seeing before making such a costly purchase. Furthermore, even these low-quality images require a dedicated employee to move vehicles and physically move around the subject vehicle to take the pictures. The photographer also has to manually collate the images, name, and upload the files, which is a labor intensive and time-consuming task, considering one photographer may be required to shoot upwards of 75 vehicles a day.

Furthermore, producing high quality images is not only time consuming, but is costly and requires a studio set up. Vehicle images are particularly hard to obtain without unwanted reflections of the photographer, the surroundings, or light sources; however, reflection free images are critical to be able to discern surface imperfections, scratches, and dents on a vehicle surface. FIGS. 2A and 2B illustrate an existing studio configuration 10 for generating a contrast break line 12 on a vehicle with additive lighting. The bottom edge 16 of a light box 14 creates the break line 12 between highlight and shadow. FIGS. 3A and 3B illustrate an existing studio configuration 20 for generating a contrast break line 12 on a vehicle with subtractive lighting. The bounce fill light is a large source and makes a soft reflection in the sheet metal. A gray wall is added to "subtract" the reflection from the lower half of the truck to create contrast and shape.

While these studio shots are effective in creating high quality vehicle images, the studio shots are not amenable to the high throughput required for high volume vehicle sales and often require separate inspection areas. Thus, there is a need to be able to inspect a vehicle for defects and rapidly produce high quality reflection free images of vehicles from multiple angles and perspectives.

SUMMARY OF THE INVENTION

A booth for photographing or inspecting a vehicle includes walls that bounding a planar stage, each of the walls has a first portion and a second portion, the first portion has a first length and extending up from the planar stage. A first end of the first portion forms a first obtuse angle with the planar stage inside the booth, the second portion has a second length and extending up from a second end of the first portion. A first end of the second portion forms a second obtuse angle with the second end of the first portion inside the booth. A platform is also suspended above the stage. A lighting source is positioned on the platform. The lighting source is configured to direct light toward the second portion of each of the walls.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

The present invention has utility as an enclosable booth structure configured to cast indirect light upon a vehicle for inspection and capturing high quality photographs of the vehicle without unwanted glare and light reflections appearing on the vehicle body. The images captured have controlled reflections from multiple angles and perspectives. The room shape is chosen such that light emitted from the lighting source reflects off the walls of the booth, which in turn reflects that light indirectly upon the vehicle, providing an ideal environment for inspection of the vehicle and exterior and interior photography of the vehicle. A viewer is able to discern whether there are surface imperfections, scratches, and dents on a vehicle surface. Reflections are controlled in the booth with the angled walls, and in some embodiments a matching angled door, that are covered with a light scattering sheet material such as a white or gray walls or canvas.

It is to be understood that in instances where a range of values are provided herein, that the range is intended to encompass not only the end point values of the range, but also intermediate values of the range as explicitly being included within the range and varying by the last significant figure of the range. By way of example, a recited range of from 1 to 4 is intended to include 1-2, 1-3, 2-4, 3-4, and 1-4.

Embodiments of the inventive enclosable photographic inspection booth provide a photography and inspection stage in one with indirect lighting of a vehicle positioned on the stage. The position and angle of the walls of the booth coupled with the location of the lighting source result in indirect lighting of the vehicle on the stage such that a high quality inspection can be conducted and high quality, glare free, reflection controlled photographs can be captured, which are critical to be able to discern surface imperfections, scratches, and dents on a vehicle surface and other potential vehicle defects.

Figure 6:
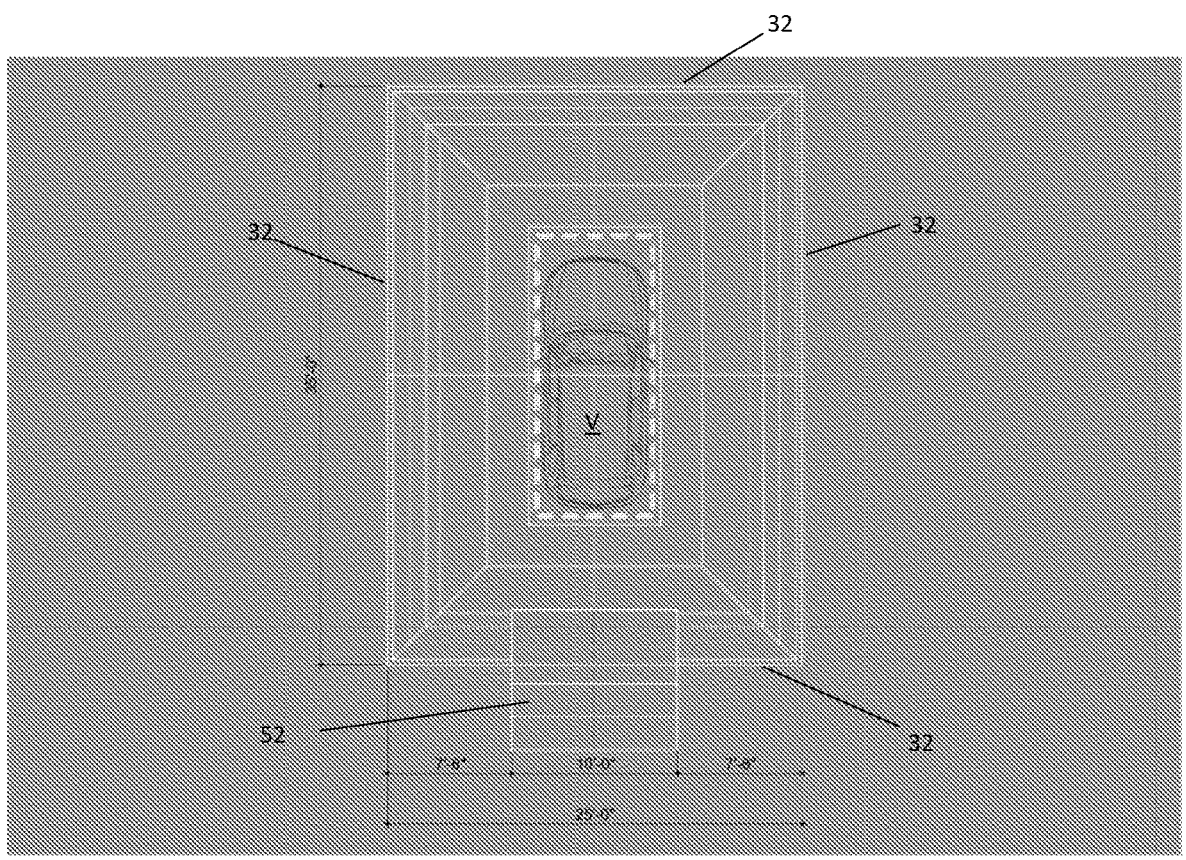
FIG. 6 is a top view the enclosable photographic inspection booth showing the placement of the lighting fixtures and a vehicle in the booth with an access door open in accordance with an embodiment of the invention.
Figure 7:
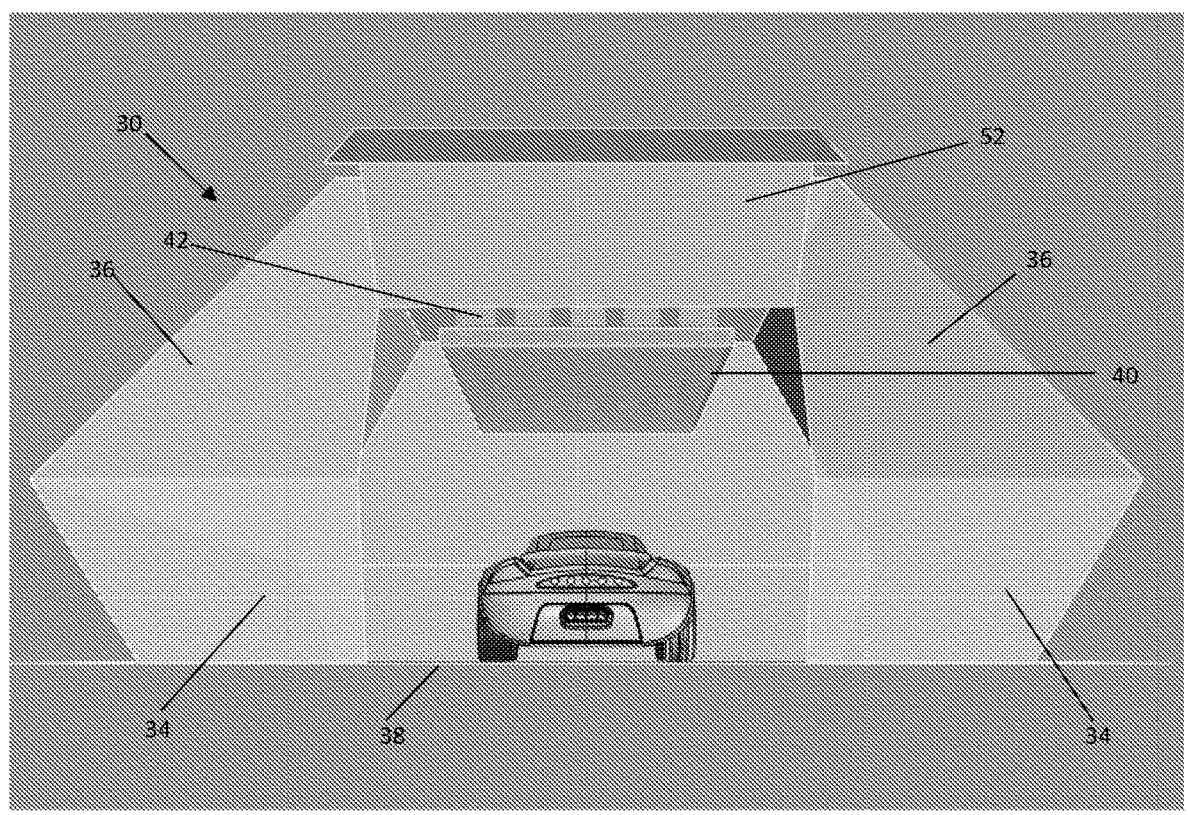
FIG. 7 is a front view of the enclosable photographic inspection booth showing the placement of the lighting fixtures and a vehicle in the booth with an access door open in accordance with an embodiment of the invention.
Figure 8:
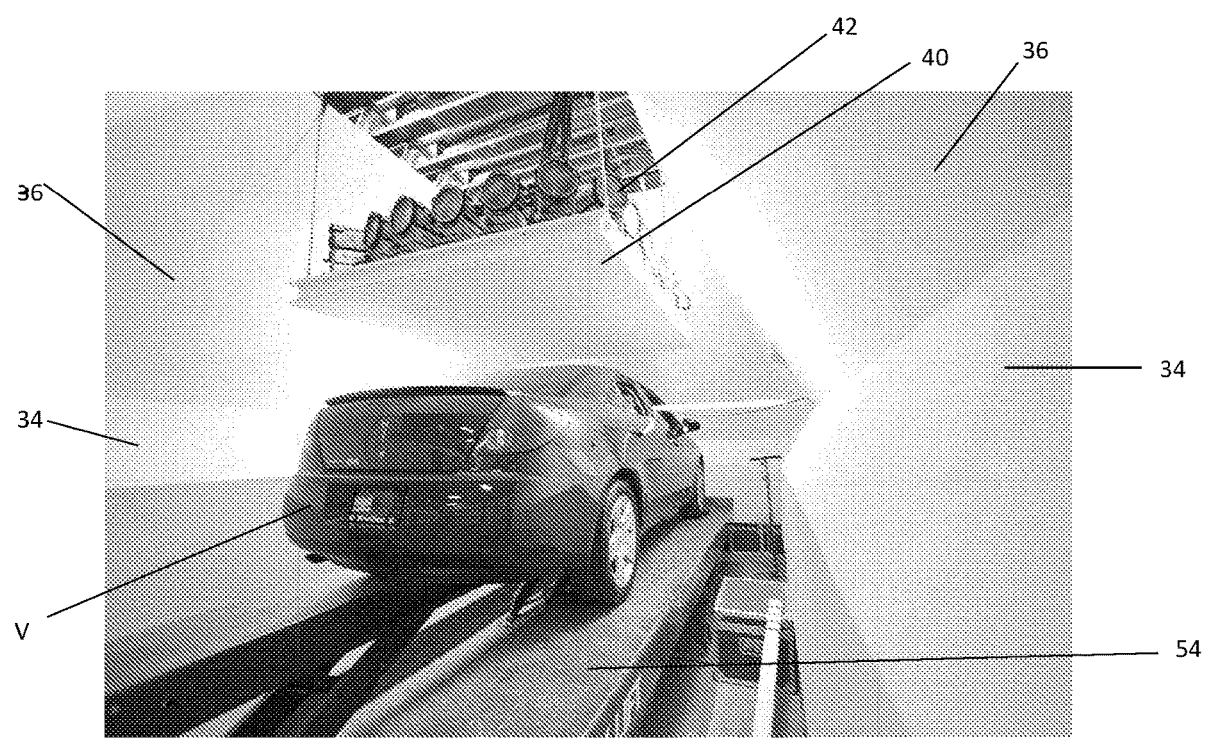
FIG. 8 is a perspective view showing a vehicle on an elevated platform within an enclosable photographic inspection booth in accordance with an embodiment of the invention.
Figure 9:
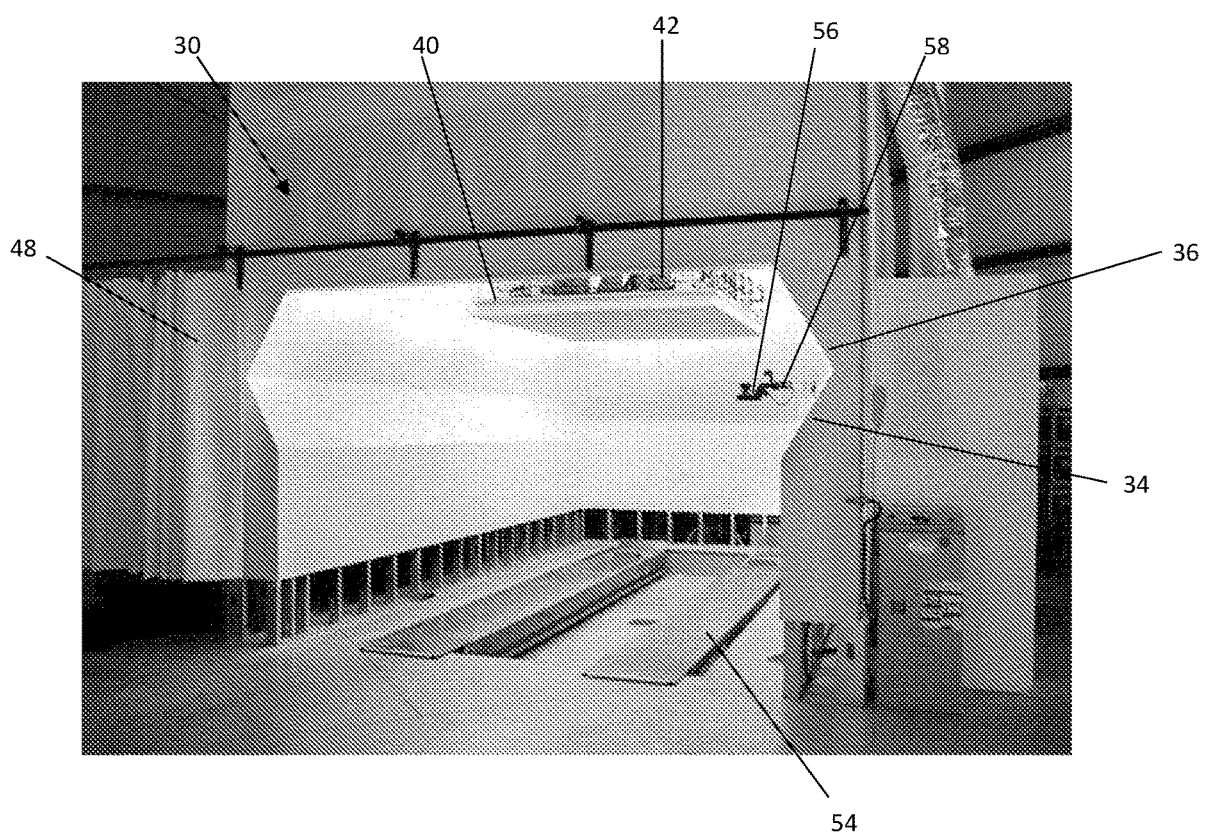
FIG. 9 is a perspective view showing an enclosable photographic inspection booth with an access curtain open and an elevatable platform in its low position, the placement of the lighting fixtures and an articulating camera are also shown in accordance with an embodiment of the invention.

Referring now to the figures, embodiments of the enclosable photographic inspection booth are shown generally at 30 in FIGS. 4-9. The booth 30 is constructed of a plurality of angled walls 32 that bound a planar photography or inspection stage 38. The walls 32 form a photographic background within the booth 30. According to embodiments, the inspection stage 38 is generally rectangular and configured to receive and display a vehicle V. The planar stage 38 is a horizontal plane within the booth 30 at which a vehicle V is to be positioned for inspection and/or photography. According to embodiments, the planar stage 38 is the ground or floor or an existing structure, such as the floor of a building or the ground in a parking lot or field. Alternatively, the planar stage 38 is a layer of material that is placed upon the floor or ground to give the planar stage 38 a desired color or appearance, such as the same or similar color or appearance as the plurality of angled walls 32 of the booth 30. According to embodiments, the planar stage 38 includes a mirrored surface, such that when is vehicle is positioned on the planar stage with the vehicle underbody positioned above the mirrored surface, an inspector can inspect the vehicle underbody by looking into the mirrored surface to see a reflection of the vehicle underbody. According to embodiments, the mirrored portion of the planar stage 38 is smaller than the footprint of the vehicle so that the mirrored surface does not appear in any photographs. According to embodiments, the mirrored portion of the planar stage 38 is configured to be moved around and positioned under the vehicle body. According to embodiments, the planar stage 38 is horizontal plane within the booth 30 that is elevated above the floor or ground, such as in FIGS. 8 and 9. As shown in FIGS. 8 and 9, the planar stage 38 is above the floor of the building and a lift 54 is provided in the booth 30 to raise the vehicle V from the ground level to the planar stage level 38.

The walls may be made of wood, composites, aluminum, etc. In an embodiment (not shown) the structure may be made of prefabricated pieces of fiberglass or Styrofoam blocks, or an inflatable structure. The walls 32 may be covered in a heavy canvas or fiberglass composite skin to eliminate the need for drywall and sanding at the drywall seams. In an embodiment the canvas may be stapled to the wall 32, with the staples covered by a painted patch to hide the staples and the seam. The booth 30 is amenable to being disassembled and moved as required.

Each of the angled walls 32 includes a lower, first portion 34 and an upper second portion 36. The first portion 34 of each wall 32 has a first length L1, while the second portion 36 has a second length L2. According to embodiments, the first length L1 of the first portion 34 is shorter than the second length L2 of the second portion 36. The first portion 34 of each wall 32 extends up from the planar stage 38, angled such that a first end 31 of the first portion 34 forms a first obtuse angle α with the planar stage 38 inside the booth 30, such that the first portion 34 of each wall 32 is angled up and out from the booth 30. The second portion 36 of each wall 32 extends up from a second end 33 of the first portion 34 of each wall 32. The second portion 36 of each wall 32 is angled such that a first end 35 of the second portion 36 of each wall 32 forms a second obtuse angle β with the second end 33 of the first portion 34 of each wall 32 inside the booth 30. According to embodiments, the first obtuse angle α is larger than the second obtuse angle β. According to specific embodiments, the first obtuse angle α each independently between 93° and 124°. In some inventive embodiments, the angles α and β are within ±5° of one another. In the embodiment shown in FIG. 5, the angles α and β are 114° and 116.5°, respectively. The angles of the walls provide a soft highlight on the vehicle surface, allowing an inspector to readily see defects in the vehicle surface and allowing for high quality photographs to be taken. The overall shape of the booth and the angles of the walls project light into and through the centerline of the vehicle. The opposing angled wall then bounces a percentage of the down light back up into the headliner of the vehicle to further light the vehicle for inspection and photographs. The angles of the walls provide the perfect amount of lighting for inspection and photography; any less light and the lighting of the vehicle would be too dark; any more-light and the lighting of the vehicle would look unnatural. According to embodiments, the walls 32 are covered in a white or grey light scattering material.

Figure 1A:
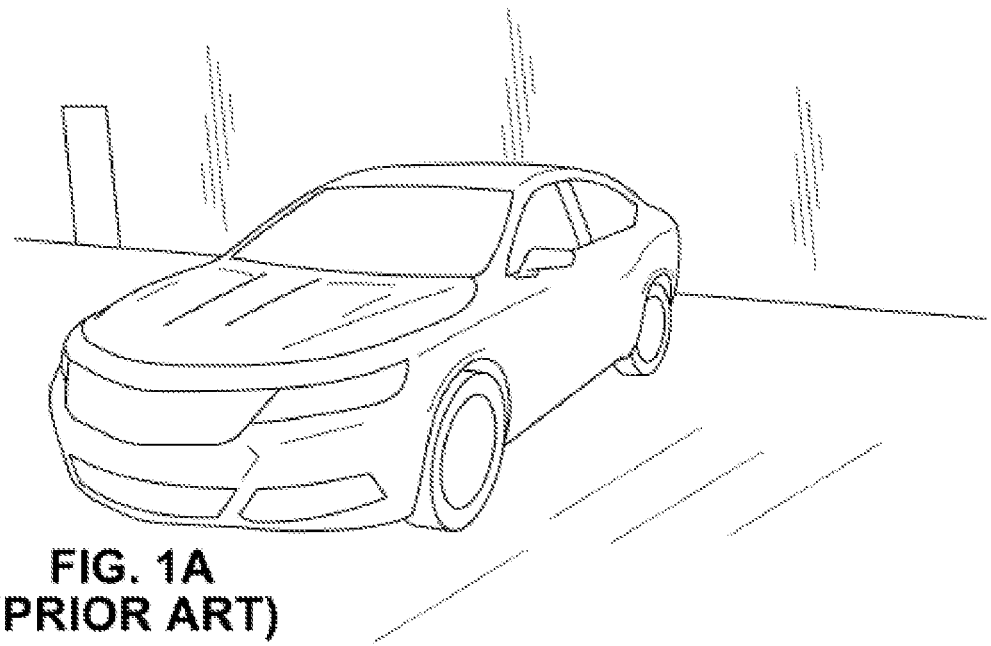
FIGS. 1A and 1B are typical non-studio quality vehicle photographs.
Figure 1B:
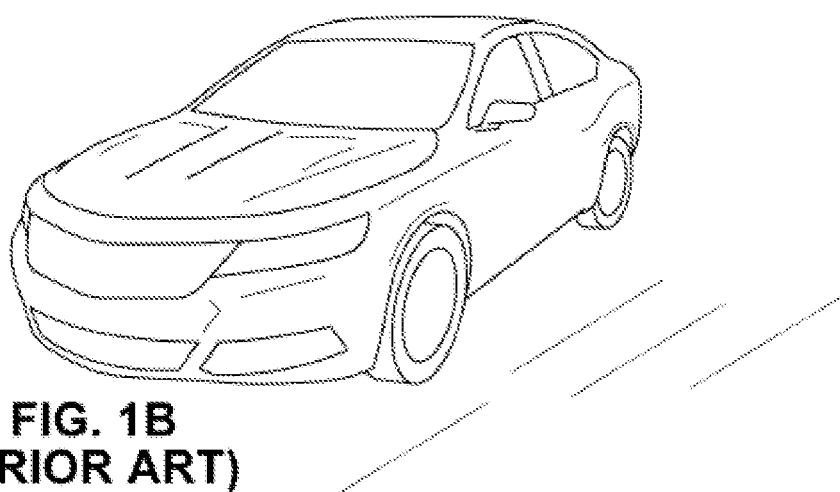
Figure 2A:
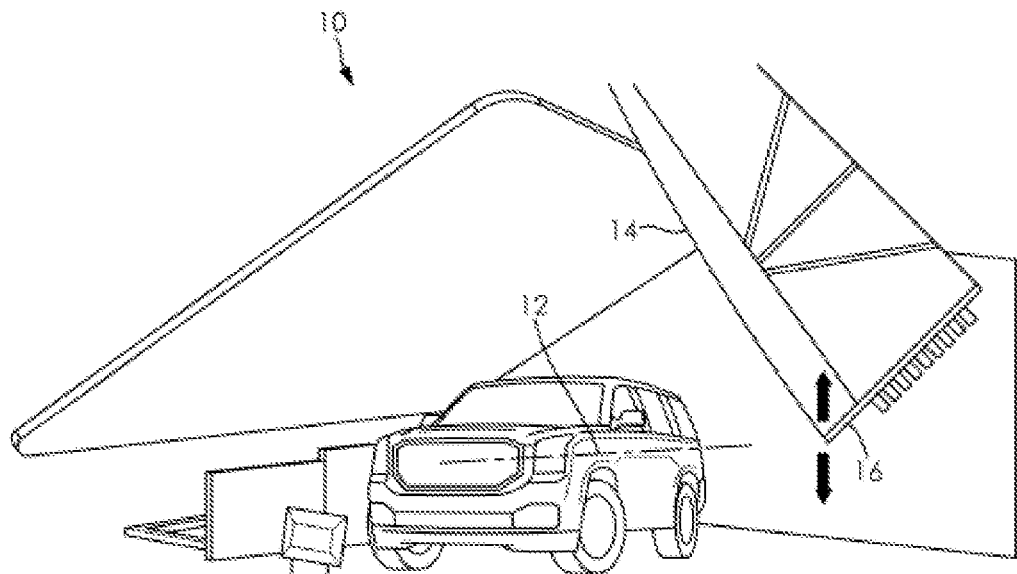
FIGS. 2A and 2B illustrate an existing studio configuration for generating a contrast break line on a vehicle with additive lighting.
Figure 2B:
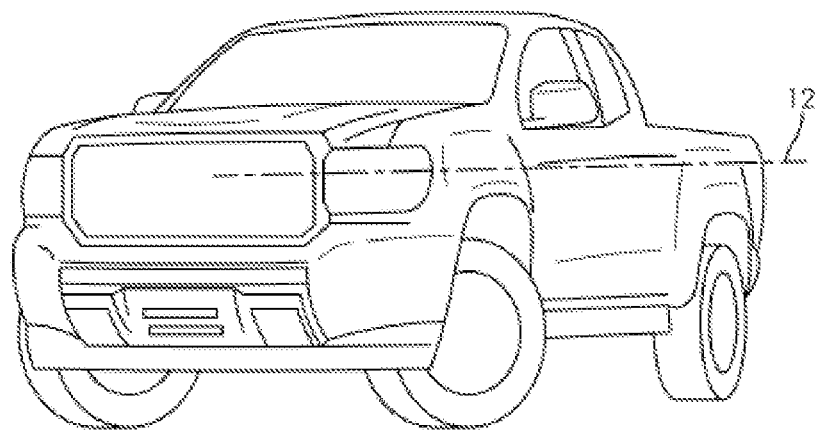
Figure 3A:
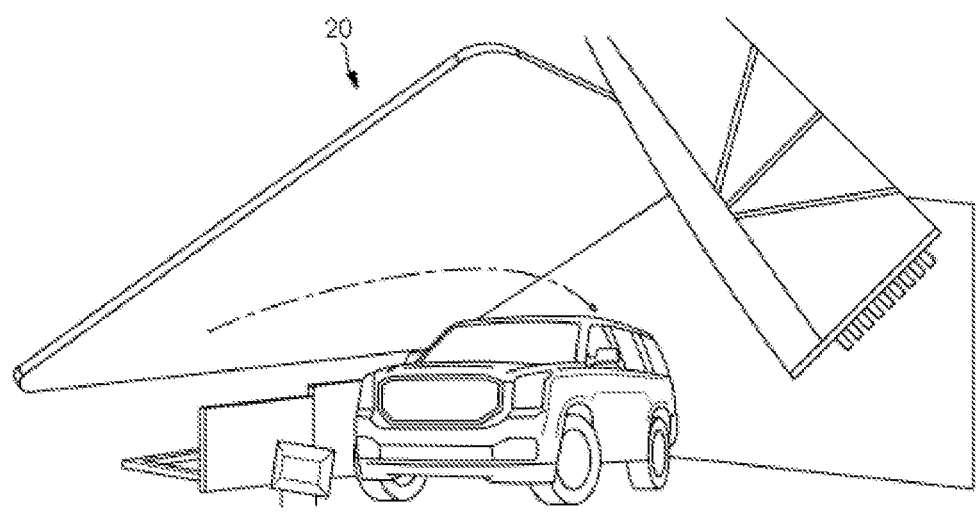
FIGS. 3A and 3B illustrate an existing studio configuration for generating a contrast break line on a vehicle with subtractive lighting.
Figure 3B:
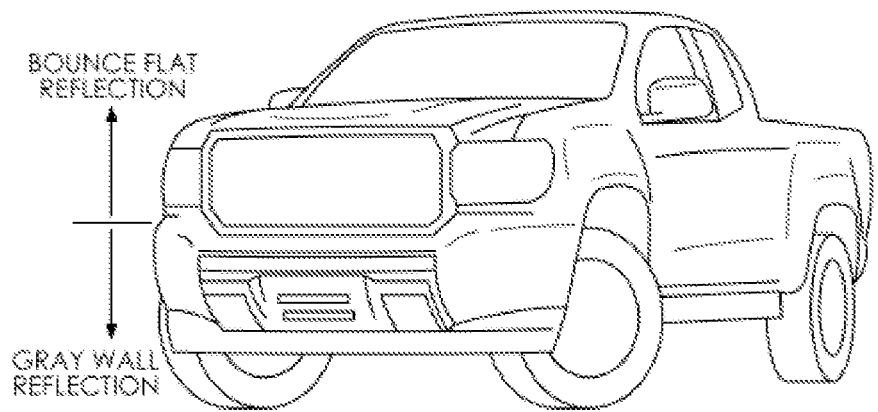
Figure 4:
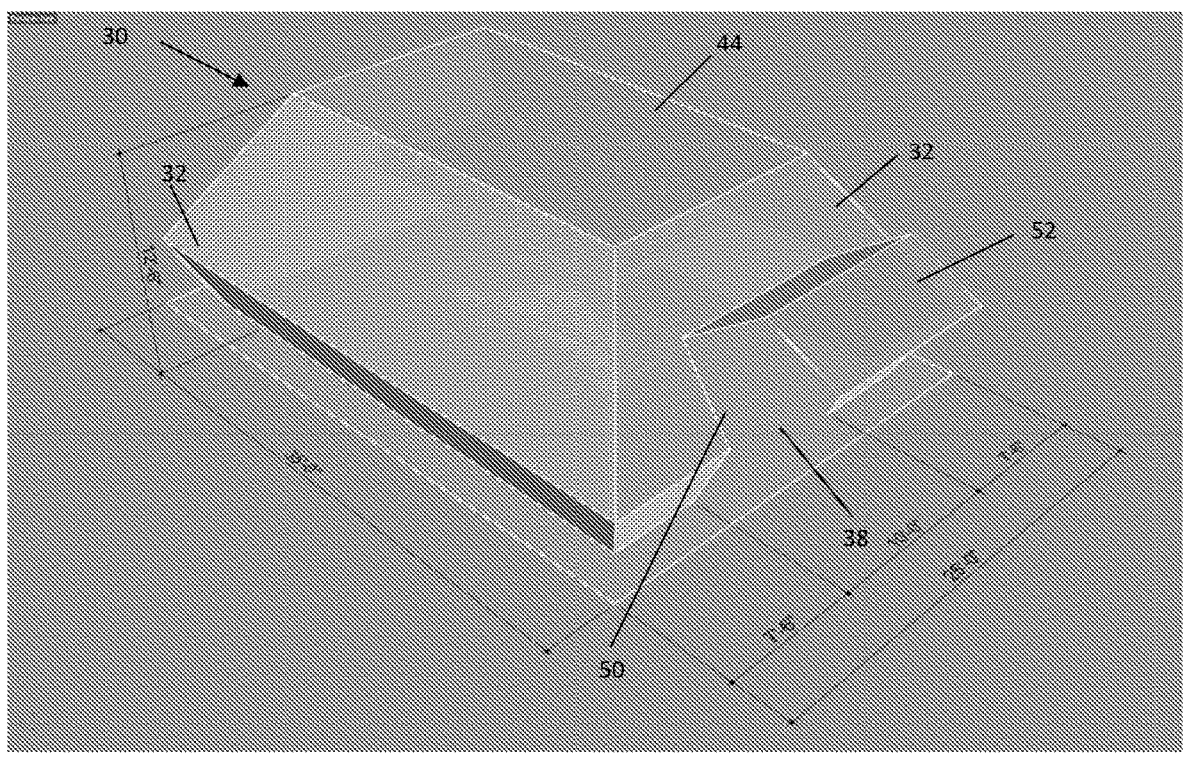
FIG. 4 is a perspective view of an enclosable photographic inspection booth in accordance with an embodiment of the invention.

According to embodiments, the booth 30 includes at least three walls 32, such as in FIG. 9, or four walls 32 such as in FIGS. 4, 6, and 7. As shown in FIG. 9, the stage 39 is bounded by three angled walls 32, leaving a fourth side of the booth 30 open. This opening in the booth 30 allows a vehicle V to be moved into and out of the booth 30 to access and be positioned on the stage 38, which according to embodiments may include raising the vehicle V to the planar stage 38 level using a lift 54. As shown in FIG. 9, a curtain 48 is configured enclose the open side of the booth 30 in such three walled 32 embodiments. That is, the curtain 48 is configured to move between an open position, as shown in FIG. 9, in which one side of the booth 30 is unbound and a closed position in which the curtain 48 extends between two of the walls 32 such that the planar stage 38 is fully enclosed or surrounded.

Figure 10:
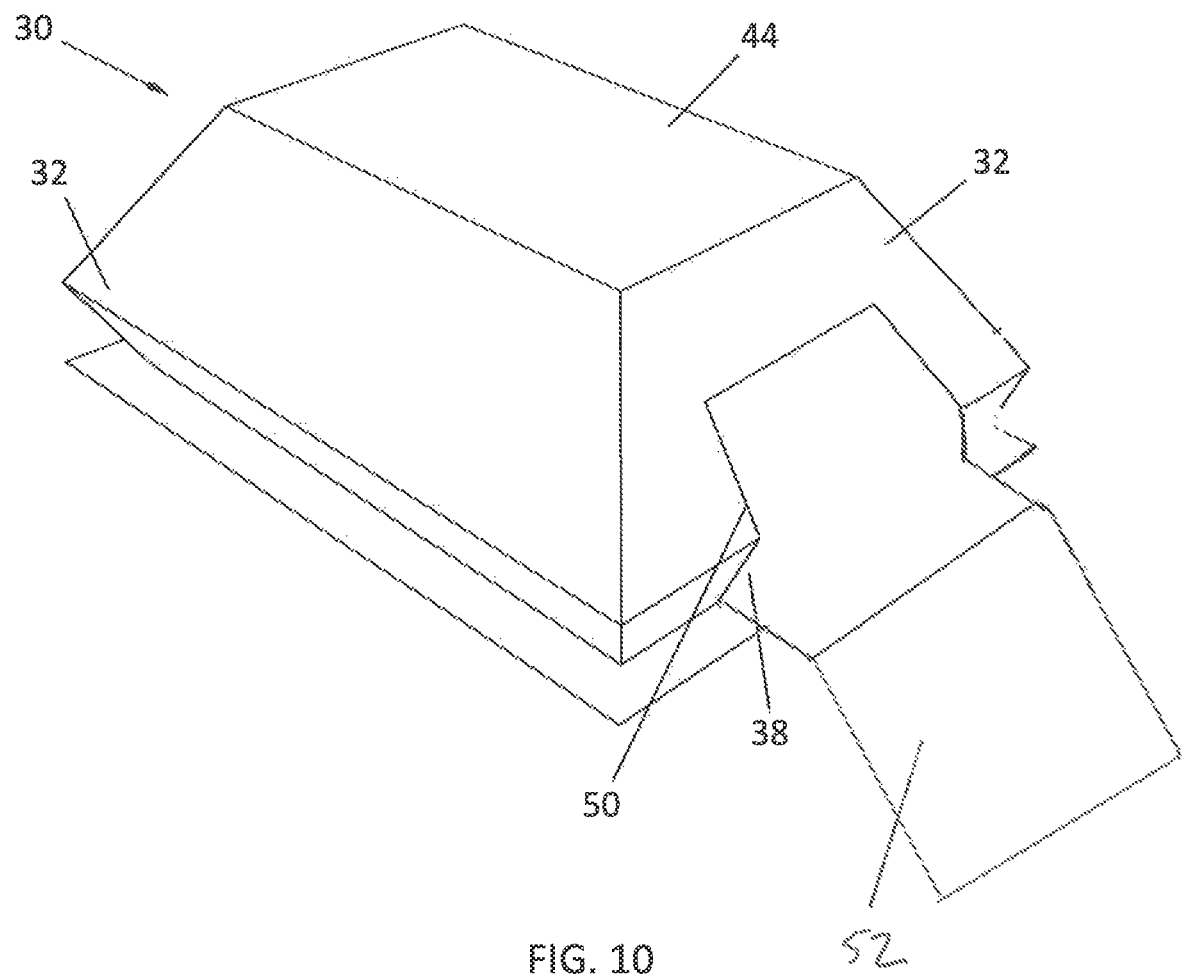
FIG. 10 is a perspective view of an enclosable photographic inspection booth in accordance with an embodiment of the invention.

As shown in FIGS. 4, 6, and 7, the stage 38 is bounded by four walls 32. In such embodiments, an opening 50 is provided in one of the four walls 32. This opening 50 in the booth 30 allows a vehicle V to be moved into and out of the booth 30 to access and be positioned on the stage 38, which according to embodiments may include raising the vehicle V to the planar stage 38 level using a lift. According to embodiments, the opening 50 may be covered with a curtain 48 as described above with regard to FIG. 9, or alternatively the booth 30 includes a door 52. According to embodiments, the door 52 is configured to move between an open position in which the opening 50 is exposed, as shown in FIGS. 4, 6, and 7, and a closed position in which the opening 50 is closed such that the booth 30 is fully enclosed. According to embodiments, the door 52 has the same shape as the walls 32. That is, when the door 52 is in the closed position the door blends seamlessly with the wall 32 and has the same contours as the wall 32. According to embodiments, the door 52 is hinged and swings out from the booth 30, away from the interior of the booth 30. The door 52 may be a single door hinged to open to the side or to open in an upward movement. Alternatively, the door may be two portions that fit together to form the door 52. The two portions of the door may be hinged to open to the side or to open in an upward movement. Alternatively and as shown in FIG. 10, the door 52 may be hinged such that it opens in a downward movement, in such cases, the door may be used as a ramp for the vehicle V.

The booth 30 also includes a platform 40 suspended above the stage 38 and a lighting source 42 positioned on the platform 40. The lighting source 42 may include a plurality of lights that can be controlled and turned on and off independently of one another. The lighting source 42 typically has between 20 and 100 strobes, while in specific embodiments, between 40 and 80 strobes. The lighting source 42 is configured o direct light toward the second portion 36 of each of the plurality of walls 32. According to embodiments, an additional lighting source is provided under the vehicle when positioned on the planar stage 38. This additional lighting source is positioned upwards such that it casts light upon the vehicle underbody so that an inspector may see the details of the vehicle underbody and inspect for any fluid leaks or damage to the vehicle underbody. According to embodiments, a camera is also provided under the vehicle such that the vehicle underbody may be photographed.

Figure 5:
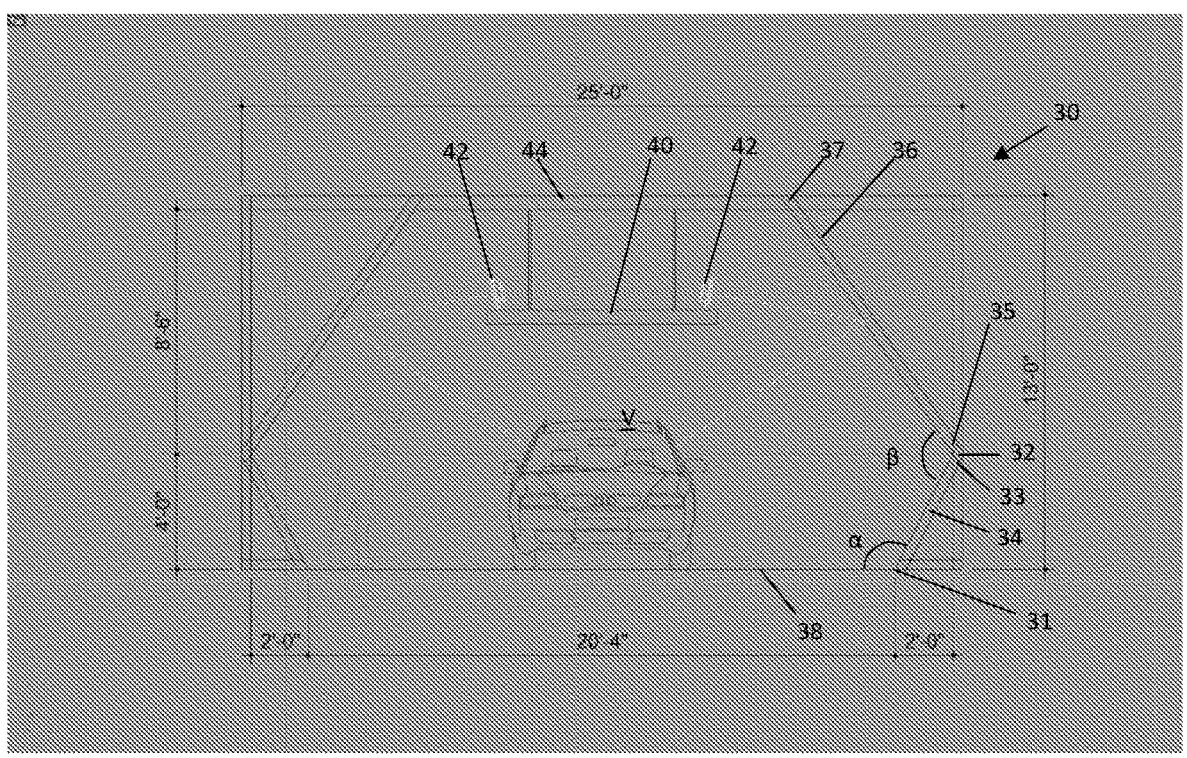
FIG. 5 is a cross-sectional view of the enclosable photographic inspection booth showing the placement of the lighting fixtures, a vehicle, and a photographer in the booth during use in accordance with an embodiment of the invention.

The lighting source 42 provides bounce lighting that provides indirectly lights the vehicle. As shown in FIG. 5, the light bounces off the second portion 36 of the walls 32 and the light is redirected at many angles and thus never builds up into a sheen, and still provides bounce light for the vehicle. From the lighting mounted position, the lights brighten the upper portion of the booth 30 with soft light and brightly lights the second portion 36 of the walls 32 while not creating any direct lighting source reflections in the vehicles paint. Light from the lighting source 42 is then reflected off the second portion 36 of the walls 32 and scattered due to the light scattering material on the walls 32. The light scatters around the booth 30 to indirectly light a vehicle V positioned on the planar stage 38. According to embodiments, the booth 30 includes a ceiling 44 that extends from the second end 37 of the second portion 36 of each wall 32, from which the platform 40 is suspended. The position of the lighting source 42 on the platform 40 allows the lighting source 42 to be hidden from view of any camera. The lighting source 42 and its position relative to the walls 32 provide for controlled reflections on the vehicle surfaces. No reflections of the light sources or of the lighting fixtures themselves show up in the vehicle surface paint. Embodiments of the structure booth form a large smooth white or gray room to accent and complement the vehicle's natural body lines.

The shape of the structure booth 30 wraps light around the front and rear of the vehicle, which allows the vehicle to be photographed from multiple angles and still have the same high-end look without the need to adjust the lighting for each shot for a given subject vehicle. Thus, while the viewing angle may change, the lighting style remains consistent across all viewpoints.

The booth 30 may be used to light the vehicle V and then a photographer or inspector can enter the booth 30 to manually photograph and inspect the vehicle, as shown in FIG. 5. Alternatively, embodiments, of the invention provide that the booth includes at least one camera 56 within the booth 30, as shown in FIG. 9. The camera 56 is configured to capture photographs of a vehicle V positioned on the planar stage 38. According to embodiments, there are several stationary cameras 56 mounted throughout the booth 30 at predetermined locations. According to further embodiments, the at least one camera 56 is mounted on an articulating arm 58 that moves within the booth 30 to capture photographs of the vehicle V from different angles and perspectives.

Embodiments of the inventive enclosable photographic booth 30 employ cameras 56 deployed around the parameter walls 32 and ceiling 40 of the photographic booth 30. The cameras 56 may be secured by brackets to the walls 32. The cameras 56 and lighting elements 42 are concealed. The positioning of the cameras 56 provide varying perspectives of the vehicle being photographed when the vehicle is positioned on the planar stage 38.

In embodiments of the photographic booth 30, the lighting may be setup in zones that relate to each camera position. In a specific embodiment, there are 10 to 30 strobe heads, and in some embodiments between 16 and 52 strobe heads that fire for every triggering position as various perspective photographs of the vehicle are taken. Each camera position may have its own dedicated strobe group. The strobe group, when added with the base group has been optimized to give the best lighting for that angle of view or zone. One of the key points of this zone system is that the subject vehicle can be brightened without brightening the background. That is to say if all strobes fired at the same time then the only way to brighten the car would also brighten the background. An overly white background will produce haze or flare in the photographs. It should be noted that the base strobe heads are turned all the way down, and this is what allows the base strobes to recharge very quickly and be ready again when the next zone needs to fire.

When shooting interiors, the automated lighting in some inventive embodiments will turn up lights behind the photographer while turning down the ones lighting the background seen through the windows at that angle. Thus, making it possible to photograph a dark interior or trunk without getting background flare.

In inventive embodiments, a script is run, triggering each camera in series and each light individually or in groups. These images can be analyzed to determine if any of the lighting equipment is not firing. If a group of lights from a specific camera view is read as darker than it should be then each light is in turn fired and each new photograph examined to narrow down and pinpoint which lighting fixture is not working.

The booth 30 may also include an RFID reader or automatic bar code reader which may be mounted at or above the opening 50 to the booth 30 to read the identification tag associated with a subject vehicle. The driver of the vehicle in some embodiments may have an RFID name tag to track who shot the images or to monitor productivity. Also mounted at the opening 50 may be a series of driver feedback lights such as red and green lights. In a specific embodiment, a blue light indicates that the booth is ready for a vehicle to accept a vehicle. A green light indicates a successful RFID read and drive through. In the event of a bad RFID read and the indicator light goes red. Pressure sensor strip activates the system when the vehicle tire runs over the sensor strip. Painted guide strips provide a visual path for the driver to proceed into the booth 30 and onto the stage or platform 38. According to embodiments, the lighting and/or camera positioning and firing is controlled by a remote that the photographer or inspector may use, active tracking of the photographer or inspector, or by presents.

Embodiments of the inventive enclosable photographic inspection booth allow for a complete set of multi perspective high quality vehicle images to be obtained in less than 90 seconds, and in some instances in approximately 5, 10, or 15 seconds. The rapid processing time of the inventive enclosable photographic inspection booth provides images that are equivalent to existing professional photographic staging methods that take several minutes to several hours obtain a set of vehicle images. The rapid image processing and recordation of vehicle condition allows for new business models such as creating virtual or cyber dealerships where a wholesale customer never takes possession of a subject vehicle, and the vehicle is dropped shipped to the end retail customer. Photos obtained with the inventive system may be sold along with the subject vehicle for use by a purchasing used car retailer, and as it typically takes four days for the buyer to take delivery of the wholesale vehicle, with instant access to the vehicle photos the purchaser can start advertising the vehicle four days prior to physically taking possession of the vehicle.

Embodiments of the inventive enclosable photographic inspection booth may utilize radio frequency identification (RFID) tags to identify and record vehicles as the vehicles are processed through the system. The RFID may be related to the vehicle identification number (VIN) of a vehicle to be processed. Information related to the vehicle, such as vehicle make, model, body style, and color encoded in the VIN may be used to automatically adjust lighting, the height of the vehicle to optimize photographic conditions, as well as camera height, zoom, and camera placement/position for a subject vehicle to be processed. Through control of lighting and camera firing sequence, the driver of a vehicle is virtually invisible as a result of being hidden by glass reflection. Further information that may be related to the RFID may include a dealership setting that may also indicate which dealer the vehicle is being shot for and incorporate that dealer's specific preferences such as lighting style, file size and format, number of photo shots and angles to be recorded. RFID or bar code information, read manually or automatically may also be used to project text onto the background of the shot or overlay text onto the file during processing, such as price, dealer name, vehicle specifications, mileage, etc. In a manual "Walk Around" booth embodiment, knowing the make and model number or client in the case of a shared booth could automatically tell the photographer where to stand and what pictures to take. Embedded LED lights in the walls and floor of the booth, or a single overhead theater tracking light may direct the photographer where to stand to take a picture. As a result of preset angles and lighting, high quality images are collected in a fraction of time compared to an individual vehicle photo-session. In some inventive embodiments, each photograph triggers the next lighting and photographer position. The number of shots and positions in some inventive embodiments are determined by the RFID and data base information. Utilizing the optical tracker of embodiments of the invention, the program of where and how to shoot can be obtained by watching and recording a "real professional" photographer shoot a vehicle of similar body style. This recording would include all lighting positions and settings, camera and lens metadata as well as height and distance. This information would be stored in a reference bank and used to automatically recall and reconfigure the room for each new shot. In some embodiments the non-tech operator's images are automatically compared to the professional photographer's images and accepted or rejected based on certain matching criteria.

As a person skilled in the art will recognize from the previous detailed description and from the figures and claims, modifications and changes can be made to the preferred embodiments of the invention without departing from the scope of this invention defined in the following claims.

The invention claimed is:

1. A booth for at least one of photographing or inspecting a vehicle, the booth comprising:
a plurality of walls bounding a planar stage, each wall of the plurality of walls comprising a first portion and a second portion, the first portion having a first length and extending up from the planar stage, a first end of the first portion forming a first obtuse angle with the planar stage inside the booth, the second portion having a second length and extending up from a second end of the first portion, a first end of the second portion forming a second obtuse angle with the second end of the first portion inside the booth; and a lighting source configured to direct light toward the second portion of each wall of the plurality of walls, wherein the lighting source is configured to increase an intensity of emitted light behind a photographer while decreasing an intensity of emitted light in front of the photographer, thereby allowing the photographer to capture images of interior compartments of the vehicle without background flare.

2. The booth of claim 1, wherein at least one wall of the plurality of walls comprises an opening fitted with a curtain configured to move between an open position in which the opening is exposed and a closed position in which the curtain extends across the opening.

3. The booth of claim 1, wherein at least one wall of the plurality of walls comprises an opening fitted with a door configured to move between an open position in which the opening is exposed and a closed position in which the door covers the opening, the door having a first portion and a second portion that match the first portion and the second portion of the plurality of walls.

4. The booth of claim 3, wherein the door, when in the open position, functions as a ramp for the vehicle to enter the booth.

5. The booth of claim 1, wherein the first length is shorter than the second length.

6. The booth of claim 1, wherein the first obtuse angle is larger than the second obtuse angle.

7. The booth of claim 1, wherein the plurality of walls is covered in a light scattering material.

8. The booth of claim 1, wherein the planar stage comprises a mirrored surface configured to show an underside of the vehicle.

9. The booth of claim 8, wherein the mirrored surface is smaller than a footprint of the vehicle, thereby concealing the mirrored surface in images of the vehicle.

10. The booth of claim 1, wherein the lighting source is configured to generate bounce lighting that does not create a sheen on a surface of the vehicle.

11. A method of providing a booth for photographing or inspecting a vehicle, the method comprising:

providing a plurality of walls bounding a planar stage, each wall of the plurality of walls comprising a first portion and a second portion, the first portion having a first length and extending up from the planar stage, a first end of the first portion forming a first obtuse angle with the planar stage inside the booth, the second portion having a second length and extending up from a second end of the first portion, a first end of the second portion forming a second obtuse angle with the second end of the first portion inside the booth; and providing a lighting source configured to direct light toward the second portion of each of wall of the plurality of walls, wherein the lighting source is configured to increase an intensity of emitted light behind a photographer while decreasing an intensity of emitted light in front of the photographer, thereby allowing the photographer to capture images of interior compartments of the vehicle without background flare.

12. The method of claim 11, wherein at least one wall of the plurality of walls comprises an opening and the method further comprises providing a door configured to move between an open position in which the opening is exposed and a closed position in which the door covers the opening, the door having a first portion and a second portion that match the first portion and the second portion of the plurality of walls.

13. The method of claim 12, wherein the door, when in the open position, functions as a ramp for the vehicle to enter the booth.

14. The method of claim 11, wherein at least one wall of the plurality of walls comprises an opening and the method further comprises providing a curtain configured to move between an open position in which the opening is exposed and a closed position in which the curtain extends across the opening.

15. The method of claim 11, wherein the first length is shorter than the second length.

16. The method of claim 11, wherein the first obtuse angle is larger than the second obtuse angle.

17. The method of claim 11, wherein the plurality of walls is covered in a light scattering material.

18. The method of claim 11, wherein the planar stage comprises a mirrored surface configured to show an underside of the vehicle.

19. The method of claim 18, wherein the mirrored surface is smaller than a footprint of the vehicle, thereby concealing the mirrored surface in images of the vehicle.

20. The method of claim 11, wherein the lighting source is configured to generate bounce lighting that does not create a sheen on a surface of the vehicle.

* * * * *